(12) United States Patent
Stone

(10) Patent No.: US 8,227,068 B1
(45) Date of Patent: Jul. 24, 2012

(54) CEILING TILE

(75) Inventor: Norman Stone, Harrison, NY (US)

(73) Assignee: Tower IPCO Company Limited, Dublin (IE)

( * ) Notice: Subject to any disclaimer, the term of this patent is extended or adjusted under 35 U.S.C. 154(b) by 0 days.

(21) Appl. No.: 13/371,005

(22) Filed: Feb. 10, 2012

(51) Int. Cl.
*B23B 3/04* (2006.01)
(52) U.S. Cl. ............. 428/70; 428/76; 428/122; 156/216
(58) Field of Classification Search .................... 428/70, 428/76, 122, 194; 181/291
See application file for complete search history.

(56) References Cited

U.S. PATENT DOCUMENTS 7,846,536 B2 * 12/2010 Dubey ........................ 428/192

* cited by examiner

*Primary Examiner* — Alexander Thomas
(74) *Attorney, Agent, or Firm* — Rodman & Rodman

(57) ABSTRACT

The ceiling tile, in one embodiment of the invention, is a laminate of a rigid core layer, such as gypsum, having one surface covered by a display layer of plastic sheet material. An opposite surface of the core layer is covered by a layer of light reflective material. The design layer has a design surface that is viewable when the tile is installed in a ceiling, and the light reflective layer has an exposed light reflective surface. Both the design layer and the light reflective layer form leak tight seals on the opposite surfaces of the rigid core layer. The entire peripheral edge of the tile laminate and marginal portions of the design surface and light reflective surface are covered by a plastic leak tight tape that forms a gas tight seal at the peripheral edge of the tile laminate.

19 Claims, 4 Drawing Sheets

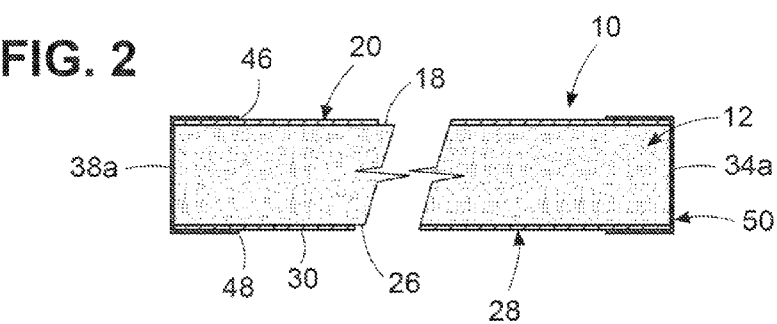
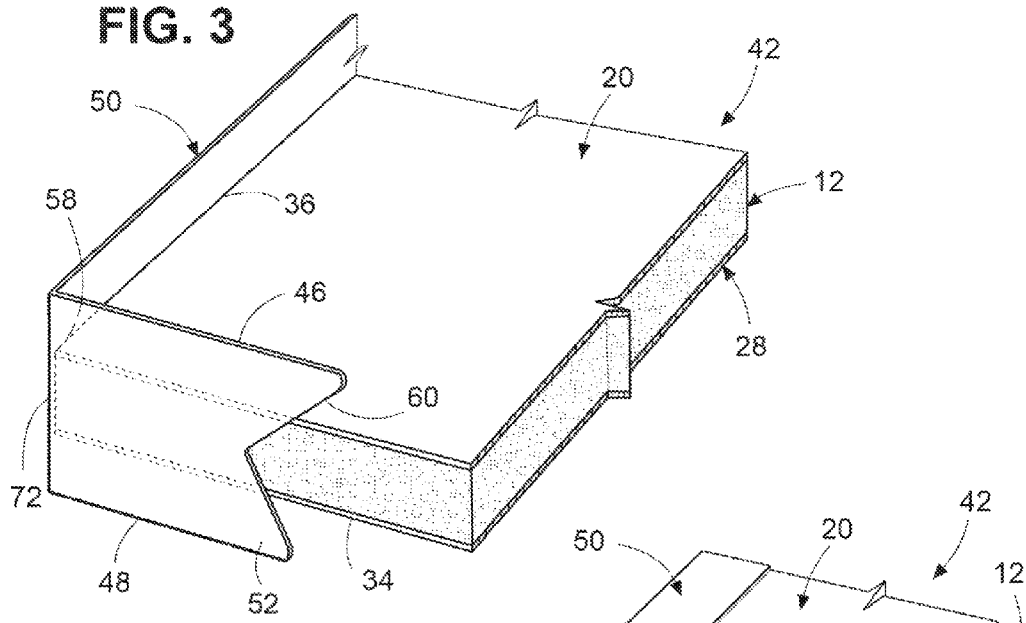
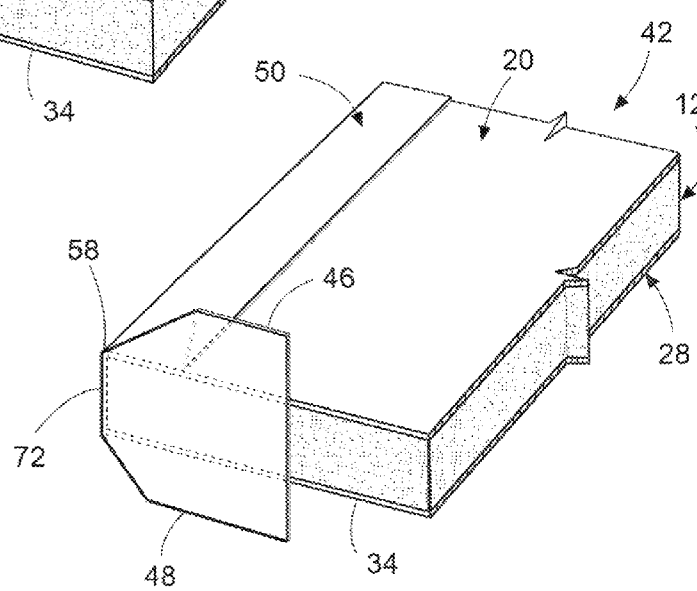

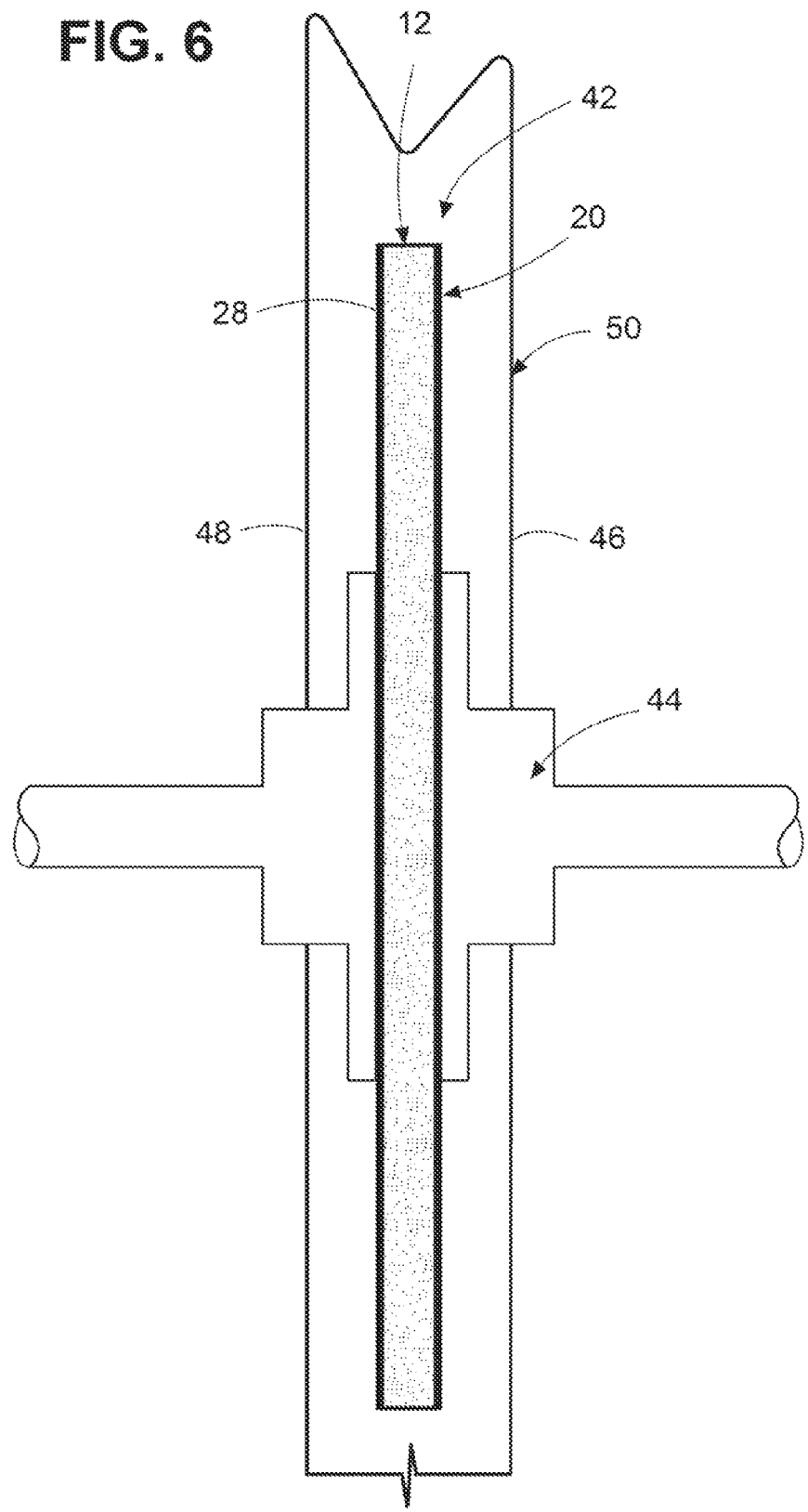

CEILING TILE

BACKGROUND OF THE INVENTION

Field of the Invention

This invention is directed to a ceiling tile for suspended ceiling installations, and more particularly to a novel rigid ceiling tile that inhibits or prevents noxious gases from being emitted by the tile.

It is known to make ceiling tiles with a rigid core that is usually formed of gypsum or a composition of gypsum. Some gypsum formulations or gypsum compositions may emit sulfur or hydrogen sulfide, which has a noxious odor, and can have a corrosive effect on various materials such as metal, as well as lead to air quality problems and resulting health issues.

The present invention solves the problem of noxious gas emission from a rigid ceiling the by providing the ceiling tile with a novel leak tight seal.

DESCRIPTION OF THE DRAWINGS

In the accompanying drawings,

FIG. 2 is a sectional view taken on the line 2-2 of FIG. 1A;

FIG. 3 is a fragmentary perspective view of a corner of the ceiling tile laminate at an initial taping stage;

FIG. 3A is a fragmentary perspective view of the corner of the ceiling tile laminate of FIG. 3 at a further taping stage;

Corresponding reference numbers indicate corresponding parts throughout the several views of the drawings.

DETAILED DESCRIPTION OF THE INVENTION

Figure 1A:
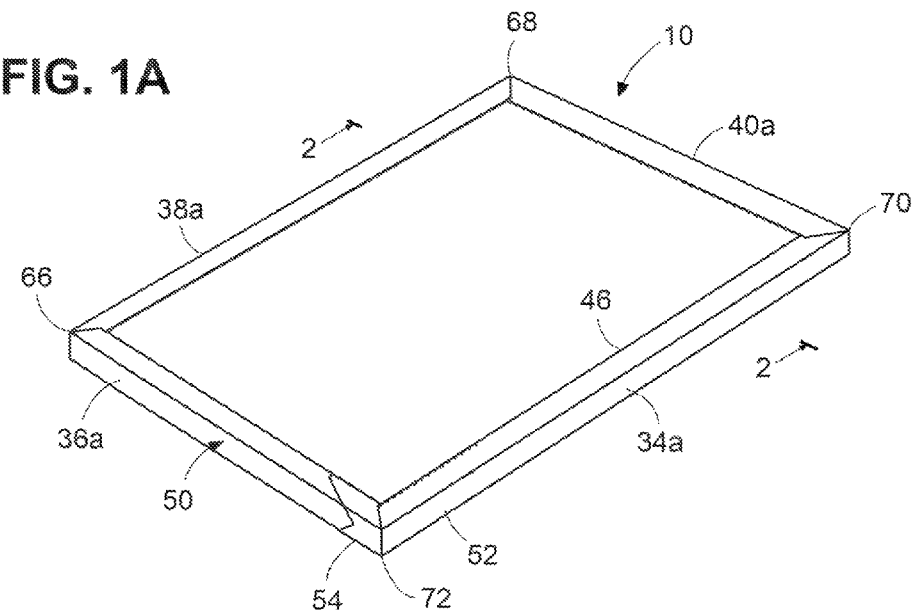
FIG. 1A is a simplified schematic perspective view of the ceiling tile incorporating one embodiment of the invention.

Referring to the drawings, a ceiling tile incorporating one embodiment of the invention is generally indicated by the reference number 10 in FIG. 1A.

The ceiling tile 10 has a polygonal shape, such as rectangular. The ceiling tile 10 is preferably in the form of a square, but can also be an elongated rectangle, although other geometric shapes are also feasible.

The ceiling tile 10 includes a rigid core 12 (FIG. 2) that is preferably formed of gypsum. An upper surface 18 (FIG. 2) of the core 12 is covered with a sheet 20 of a reflective metallic material, preferably aluminum foil. The reflective sheet 20 is laminated to the upper surface 18 of the core 12 using heat, pressure and adhesive in any suitable known manner.

A lower surface 26 (FIG. 2) of the core 12 is covered with a plastic film 28, preferably formed of a flexible vinyl material such as polyvinyl chloride (pvc) film. The plastic film 28 has an exposed surface 30 that is provided with a design or other known decorative embellishment such as color, with or without embossment.

Figure 1B:
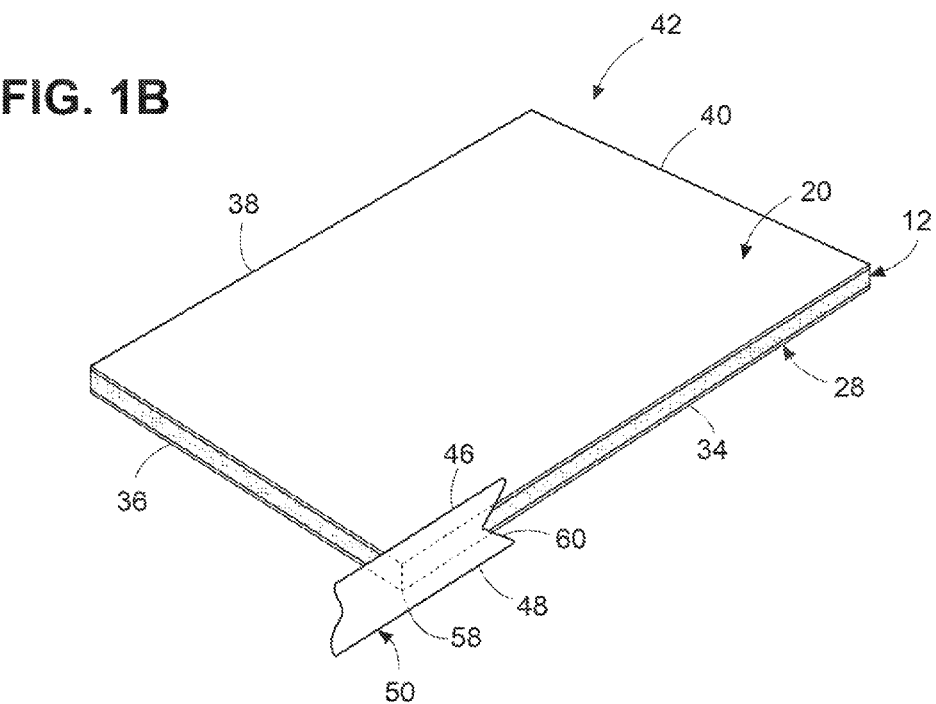
FIG. 1B is a simplified schematic perspective view of a ceiling tile laminate thereof and a tape that is used to seal the edges of the laminate.
Figure 4:
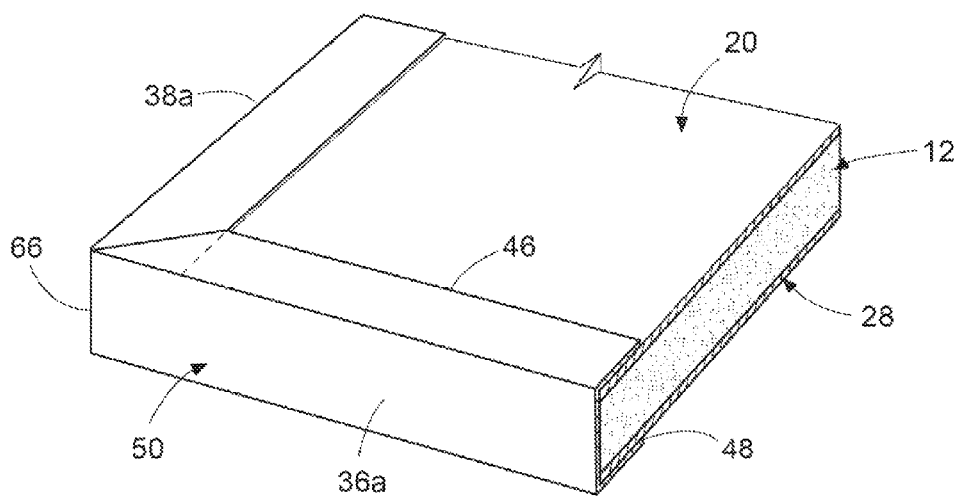
FIG. 4 is a fragmentary perspective view of another corner of the ceiling tile laminate at a still further taping stage.

A tile laminate 42 (FIG. 1B) of the gypsum core 12, the reflective sheet 20 and the plastic layer 28 has four peripheral side edges 34, 36, 38 and 40.

The gypsum core 12 is formed of calcium sulfate which usually originates in gypsum mines that may contain small amounts of sulfur and/or hydrogen sulfide gas. In some instances the gypsum in a gypsum mine contains absorbed sulfur and/or hydrogen sulfide gas (also referred to as sulfurous or noxious gases).

When the mined gypsum is processed in a known manner for use as a component in a ceiling tile most of the absorbed noxious gases are expelled from the gypsum. However some residual noxious gases may remain in the gypsum even after it is processed and formed into a core for a ceiling tile. Thus ceiling tiles with gypsum cores occasionally emit noxious gases, such as emission, even in minuscule amounts, can be sensed in an occupied space below the ceiling tile.

Applicant has found that the emission of noxious gases from gypsum can be minimized by mining the gypsum from mines that are substantially free of noxious gases. Known sulfur and hydrogen sulfide detectors can be used in a mining operation to detect the presence and concentration of these gases. Thus, it is desirable that gypsum be mined only in environments that are found to be substantially free of sulfur and hydrogen sulfide gases. Nevertheless trace amounts of noxious gases may be present in gypsum that is extracted from a mine that is supposedly free of noxious gases.

Nevertheless, a ceiling tile having a gypsum core that is believed to be free of noxious gas may still emit miniscule amounts of noxious gas after installation in a ceiling. Such emission of noxious gas occurs primarily at the edges of the ceiling tile because the reflective sheet 20 and the plastic design layer 28 are substantially leak tight members with regard to emission of noxious gas from the gypsum core 12.

To deal with the noxious gas leakage problem from a ceiling tile applicant provides an adhesive tape 50 (FIGS. 1-6), preferably formed of leak tight vinyl, to cover the side edges 34, 36, 38 and 40 (FIG. 1B) of the tile laminate 42. The adhesive tape 50 is preferably in the form of a one piece vinyl strip having opposite ends 52 and 54 that overlay each other at one corner of the tile (FIGS. 1A and 5) when applied to the edges 34, 36, 38 and 40 of the tile laminate 42. The tape 50 functions to seal in and prevent the leakage of any noxious gas from the tile 10.

Referring to FIG. 1A, at an initial stage of tile taping, the end 52 of the tape 50 is located near a corner 58 (FIGS. 1B and 3) of the tile laminate 42 where the side edges 34 and 36 intersect. The tape ends 52 and 54 are provided with an indentation or notch 60 (FIGS. 1B, 3 and 5) that gives the tape ends 52 and 54, via the notch 60, a lengthy perimeter as compared to a straight cross-cut. The increased perimeter of the tape ends 52 and 54, via the notch 60, enhance the adhesion of the ends 52 and 54 where they are secured and also reduce the visibility of the ends 52 and 54.

Figure 5:
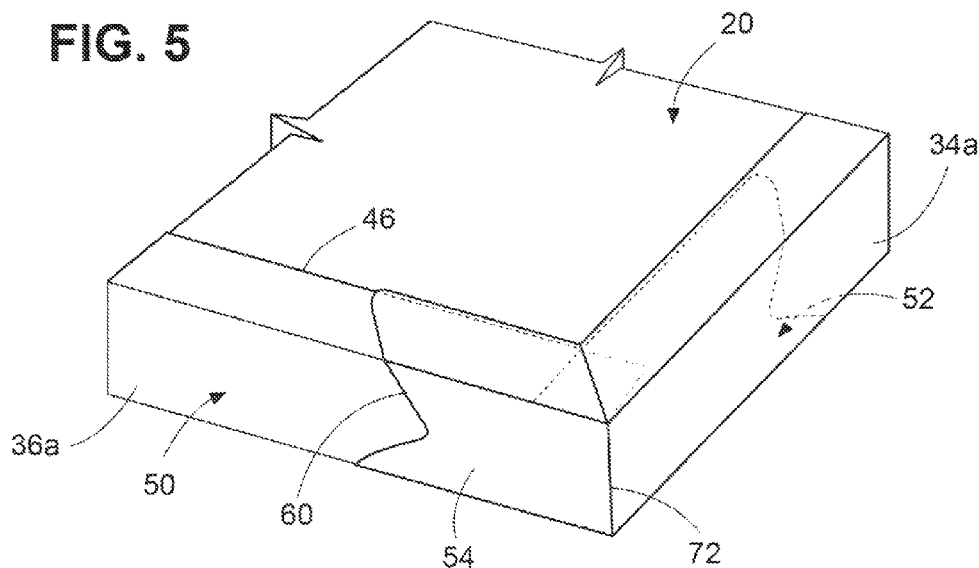
FIG. 5 is a fragmentary perspective view of the corner of the ceiling tile of FIGS. 3 and 3A after the edge taping is completed; and, FIG. 6 is a simplified schematic view of the ceiling tile laminate in a mandrel during taping of the edges of the laminate.

The tape 50 is then applied to the side edges 36, 38 and 40 (FIG. 1B) with the opposite tape end 54 overlaying the tape end 52 as shown in FIGS. 1A and 5.

The tape 50 can be applied to the edges 34, 36, 38 and 40 by holding the tile laminate 42 in a mandrel 44 (FIG. 6). The mandrel 44 is rotatable in a known manner to rotate the tile laminate 42 as the tape 50 is applied to the edges 34, 36, 38 and 40.

Referring to FIGS. 1B and 2-4, the tape 50 has edge portions 46 and 48 that are preferably sequentially folded down on the reflective sheet 20 and the plastic layer 28 at the side edges 34, 36, 38 and 40 of the tile laminate 42.

For example, the edge portions 46 and 48 of the tape 50 can be folded down in counterclockwise sequence on marginal portions of the reflective sheet 20 and the plastic layer 28 at the side edges 40, 38, 36. As shown in FIG. 3A, corner portions 66, 68, 70 and 72 (FIG. 1A) of the tape 50 are folded in and overlap at the corner intersections of the side edges 34 and 36, 36 and 38, 38 and 40, and 40 and 34 of the tile laminate 42. If desired, slight heat and pressure can be applied to the tape 50 where the tape contacts the reflective sheet 20 and the plastic layer 28.

The taped side edges of the ceiling tile 10 are referred to by the reference numbers 34a, 36a, 38a and 40a (FIG. 1A) that correspond to the side edges 34, 36, 38 and 40 (FIG. 1B) of the tile laminate 42.

As shown in FIG. 1A the tape 50 at the side edges 34a, 36a, 38a and 40a of the ceiling tile 10 adhere to marginal peripheral portions of the reflective sheet 20 and the design layer 28. The adhesive bond between the tape 50 and the reflective sheet 20 and the plastic layer 28 is substantially leak tight. Therefore the tape 50 provides a leak tight envelope around the peripheral edges 34, 36, 38 and 40 (FIG. 1B) of the gypsum core 12 of the tile laminate 42.

Under this arrangement the tape 50 inhibits or prevents any perceptible leakage or emission of noxious gases from the gypsum core 12 beyond the tape 50.

The ceiling tile 10 is thus provided with sealed leak tight edges that prevent emission of noxious gas from the gypsum core 12 of the ceiling tile 10.

When the ceiling tile 10 is installed as a hung ceiling, the tile 10 is usually held in a known suspended ceiling tile support frame (not shown). The ceiling tile support frame supports the marginal portions of the tile 10 such that only the design layer 28 is visible from the space below the hung ceiling tiles. In general, known ceiling tile support frames support the marginal edges of the ceiling tiles and permit drop-in installation of the ceiling tiles. The known ceiling tile support frames thus cover a marginal peripheral portion of the ceiling tile.

The width of applicant's tape 50 is sized to ensure that the edge portion 46 of the tape 50 that is folded over onto the marginal portions of the design layer 28 is covered by the ceiling tile support frame. Thus there is no visual appearance of the leak tight tape 50 on the ceiling tile 10 in the space below a hung ceiling containing a plurality of the ceiling tiles 10.

The outside dimensions of the ceiling tile 10 are a matter of choice. For example, the ceiling tile 10 can be two feet by two feet for a square tile and two feet by four feet for a rectangular tile, although other dimensions are feasible.

The gypsum core 12 can be approximately 5 to 9 mm thick, although other thicknesses are also feasible depending upon the overall size of the ceiling tile. The reflective metallic sheet 20 can be approximately 0.05 to 0.08 mm thick. The material used for the metallic sheet 20 is preferably a known aluminum sheet. The plastic design layer 28 can be approximately 0.05 to 0.07 mm thick, and is made of any suitable known plastic material conventionally used in ceiling tiles.

As various changes can be made in the above constructions and methods without departing from the scope of the invention, it is intended that all matter contained in the above description or shown in the accompanying drawings shall be interpreted as illustrative and not in a limiting sense.

What is claimed is:

1. A ceiling tile comprising,
    a) a display layer formed of plastic sheet material having a multi-sided polygonal periphery, a display surface displaying a design pattern, a color, a color pattern, or a decorative relief pattern, and a non-display surface, the display surface having a marginal peripheral portion and constituting the viewable surface of the ceiling tile when the ceiling tile is installed in a ceiling,
    b) a rigid core layer formed of gypsum material having the multi-sided polygonal periphery, a first surface and an opposite second surface, said first surface being bonded to and covered by the non-display surface of said display layer such that the display layer forms a gas tight seal on the rigid core layer at the first surface of the core layer,
    c) a light reflective back layer formed of a metallic material having the multi-sided polygonal periphery, an exposed light reflective surface and an opposite non-exposed surface, the non-exposed surface being bonded to and covering the second surface of said core layer such that the light reflective back layer forms a gas tight seal of the core layer at the second surface of the core layer, the exposed light reflective surface having a marginal peripheral portion, and
    d) a leak tight tape formed of plastic material enveloping the multi-sided polygonal periphery of the rigid member, said leak tight tape overlapping the marginal peripheral portion of the display surface of the display layer and the marginal peripheral portion of the exposed light reflective surface of the back layer such that the leak tight tape forms a gas tight seal of the rigid core layer at the multi-sided polygonal periphery of the core layer.

2. The ceiling tile as claimed in claim 1 wherein the gypsum that forms the core member is natural calcium sulfate having substantially no free sulfur or hydrogen sulfide gas.

3. The ceiling tile as claimed in claim 1 wherein the light reflective metallic back layer is formed of aluminum.

4. The ceiling tile as claimed in claim 1 wherein the plastic tape is formed of a self adhesive leak tight vinyl material resistant to passage of gaseous vapors.

5. The ceiling tile as claimed in claim 1 wherein the plastic tape is a one piece plastic strip of self adhesive tape.

6. The ceiling tile as claimed in claim 5 wherein the strip of plastic tape surrounds the multi-sided polygonal periphery and has one end located at one corner of the polygonal periphery and an opposite end also located at the one corner of the polygonal periphery.

7. The ceiling tile as claimed in claim 6 wherein the two opposite ends of the plastic tape overlap one corner of the multi-sided polygonal periphery and also overlap each other at the one corner of the multi-sided polygonal periphery.

8. The ceiling tile as claimed in claim 7 wherein the polygonal multi-sided periphery of the ceiling tile has intersecting edges that define corners of the tile, and wherein the plastic tape has overlapping portions at the corners of the ceiling tile other than the one corner.

9. The ceiling tile as claimed in claim 1 wherein the leak-tight tape has two marginal edge portions, one of said marginal edge portions overlapping the marginal periphery of the display surface of the display layer, and the other marginal edge portion overlapping the marginal periphery of the exposed light reflective surface of the back layer.

10. The ceiling tile as claimed in claim 1 wherein the layers of the ceiling tile have a rectangular periphery.

11. A method of making a leak-tight ceiling tile that inhibits or prevents leakage of noxious gas from the ceiling tile comprising,
    a) providing a display layer formed of plastic sheet material having a multi-sided polygonal periphery with a display surface displaying a design pattern, a color, a color pattern, or a decorative relief pattern, and a non-display surface, such that the display surface constitutes the viewable surface of the ceiling tile when the ceiling tile is installed in a ceiling, b) providing a rigid core layer formed of gypsum material having the multi-sided polygonal periphery, with a first surface and an opposite second surface, bonding the first surface to the non-display surface of said display layer such that the display layer covers the first surface of the core layer and forms a gas tight seal on the rigid core layer at the first surface of the core layer, c) providing a light reflective back layer formed of a metallic material having the multi-sided polygonal periphery, with an exposed light reflective surface and an opposite non-exposed surface, bonding the non-exposed surface to the second surface of said core layer such that the non-exposed surface of the light reflective back layer covers the second surface of the core layer and forms a gas tight seal of the core layer at the second surface of the core layer, and d) providing a leak tight tape formed of plastic material to surround the multi-sided polygonal periphery of the rigid member, and to overlap a marginal periphery of the display surface of the display layer and a marginal periphery of the exposed light reflective surface of the back layer such that the leak tight tape forms a gas tight seal on the rigid core layer at the multi-sided polygonal periphery of the core layer.

12. The method of claim 11 including forming the light reflective metallic back layer of aluminum.

13. The method of claim 11 including forming the plastic tape of a self adhesive leak tight vinyl material resistant to passage of gaseous vapors.

14. The method of claim 11 including forming the plastic tape as a one piece plastic strip of self adhesive tape.

15. The method of claim 14 including winding the strip of plastic tape around the multi-sided polygonal periphery such that one end of the tape is located at one corner of the polygonal periphery and an opposite end of the tape is also located at the one corner of the polygonal periphery.

16. The method of claim 15 including overlapping the two opposite ends of the plastic tape at the one corner of the multi-sided polygonal periphery.

17. The method of claim 16 including overlapping the plastic tape upon itself at corners of the ceiling tile other than the one corner.

18. The method of claim 11 including providing the leak-tight tape with two marginal edge portions, using one of the marginal edge portions to overlap the marginal periphery of the display surface of the display layer and using the other marginal edge portion of the tape to overlap the marginal periphery of the exposed light reflective surface of the back layer.

19. The method of claim 11 including forming the layers of the ceiling tile with a rectangular periphery.

\* \* \* \* \*